US010445616B2

(12) United States Patent
Tom et al.

(10) Patent No.: US 10,445,616 B2
(45) Date of Patent: Oct. 15, 2019

(54) ENHANCED PHASE CORRELATION FOR IMAGE REGISTRATION

(71) Applicant: BAE SYSTEMS INFORMATION AND ELECTRONIC SYSTEMS INTEGRATION INC., Nashua, NH (US)

(72) Inventors: Victor T. Tom, Bedford, MA (US); Stephen P. Delmarco, North Andover, MA (US); Helen F. Webb, Malden, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 938 days.

(21) Appl. No.: 15/004,029

(22) Filed: Jan. 22, 2016

(65) Prior Publication Data

US 2016/0217577 A1 Jul. 28, 2016

Related U.S. Application Data

(60) Provisional application No. 62/106,521, filed on Jan. 22, 2015.

(51) Int. Cl.
| G06T 7/00 | (2017.01) |
| G06K 9/52 | (2006.01) |
| G06K 9/62 | (2006.01) |
| G06T 7/32 | (2017.01) |

(52) U.S. Cl.
CPC ............... *G06K 9/52* (2013.01); *G06T 7/32* (2017.01); *G06T 2200/28* (2013.01)

(58) Field of Classification Search
CPC .................................. G06T 7/32; G06K 9/52
See application file for complete search history.

(56) References Cited

U.S. PATENT DOCUMENTS

| 4,668,982 A | 5/1987 | Tinnerino |
| 6,005,977 A | 12/1999 | Tanimizu et al. |
| 7,499,775 B2 | 3/2009 | Filippov et al. |
| 8,355,834 B2 | 1/2013 | Duggan et al. |

(Continued)

FOREIGN PATENT DOCUMENTS

WO 2014152254 A2 9/2014

OTHER PUBLICATIONS

"A Robust Image Tracker based on Phase Correlation and Fourier-Mallin Transform"—Sang-hun Jin, Gwang-sik Koh, International Conference on Control, Automation and Systems 2008, Oct. 14-17, 2008 in COEX, Seoul, Korea (Year: 2008).*

*Primary Examiner* — Mainul Hasan
(74) *Attorney, Agent, or Firm* — Sand, Sebolt & Wernow LPA

(57) ABSTRACT

An image registration system and method for matching images having fundamentally different characteristics. One exemplary feature of the system and method includes the use of an enhanced phase correlation method combined with a coarse sensor model to hypothesize and match a custom match metric to determine a best solution. The system and method may be operated on a non-transitory computer-readable medium storing a plurality of instructions which when executed by one or more processors causes the one or more processors to perform the image registration method utilizing the enhanced phase correlation.

17 Claims, 13 Drawing Sheets

(56) References Cited

U.S. PATENT DOCUMENTS

| | | |
|---|---|---|
| 8,666,661 B2 | 3/2014 | Higgins |
| 8,855,846 B2 | 10/2014 | Grzywna |
| 8,918,230 B2 | 12/2014 | Chen et al. |
| 2003/0222936 A1 | 12/2003 | Kaneko |
| 2006/0215935 A1* | 9/2006 | Oldroyd ................ G01C 11/00 382/294 |
| 2008/0298642 A1* | 12/2008 | Meenen .................. G06K 9/00 382/115 |
| 2010/0086220 A1* | 4/2010 | Minear .................... G06K 9/741 382/218 |
| 2011/0046784 A1 | 2/2011 | Anderson |
| 2012/0106800 A1 | 5/2012 | Khan et al. |
| 2012/0194873 A1 | 8/2012 | Fu et al. |
| 2012/0194879 A1 | 8/2012 | Fu et al. |
| 2012/0195523 A1 | 8/2012 | Fu et al. |
| 2012/0243797 A1* | 9/2012 | Di Venuto Dayer ....................... G06K 9/00577 382/218 |
| 2013/0188878 A1 | 7/2013 | Kacenjar |
| 2015/0317527 A1 | 11/2015 | Graumann et al. |
| 2015/0324989 A1* | 11/2015 | Smith ...................... G06T 7/00 382/278 |
| 2015/0371431 A1* | 12/2015 | Korb ........................ G06T 9/00 382/113 |
| 2016/0018224 A1 | 1/2016 | Isler et al. |
| 2016/0217577 A1 | 7/2016 | Tom et al. |
| 2016/0334793 A1 | 11/2016 | Celikkol et al. |

\* cited by examiner

ENHANCED PHASE CORRELATION FOR IMAGE REGISTRATION

CROSS REFERENCE TO RELATED APPLICATIONS

This application claims the benefit of U.S. Provisional Application Ser. No. 62/106,521, filed on Jan. 22, 2015; the disclosure of which is entirely incorporated herein by reference as if fully rewritten.

STATEMENT OF GOVERNMENT INTEREST

This disclosure was made with United States Government support under Contract No. FA8650-04-C-1675 awarded by the Department of the Air Force. The United States Government has certain rights in this invention.

BACKGROUND

Technical Field

The present disclosure relates to generally to image registration or image matching. More particularly, the present disclosure relates to phase correlation for image registration. Specifically, the present disclosure relates to an image registration system having an enhanced phase correlation system and process for image matching.

Background Information

Generally, image registration is the process of transforming different sets of data into one coordinate system, and aligning the transformed data. The data may be multiple photographs, data from different sensors, times, depths, or viewpoints. It is used in computer vision, medical imaging, biological imaging and brain mapping, military automatic target recognition, and compiling and analyzing images and data from satellites. Image registration is required to compare or integrate the data obtained from these different measurements.

Registering or matching images that have fundamentally different characteristics is a difficult task. Exemplary fundamentally different characteristics include but are not limited to underlying phenomenology, temporal differences, or matching predictions to real imagery. Feature-based methods, which are the registration (matching) methods of choice for easier applications, may not work well when the images or data contain sparse features or features that are not salient across image modalities.

For geo-registration of difficult imagery, conventional registration methods may not be able to automatically register frames of video to reference imagery due to appearance differences. In another example, when registering synthetic aperture radar (SAR) imagery to electro-optical (EO) reference imagery, the drastic differences in phenomenology may prevent most automatic registration algorithms from succeeding. Stated otherwise, conventional registration algorithms have significant difficulty registering SAR imagery to EO imagery. These difficult image registration scenarios may defeat traditional normalized correlation methods, phase correlation methods, mutual information methods, and feature-based matching methods.

Generally, spatial image registration methods operate in the image domain and match intensity patterns or features in images. Some of the feature matching algorithms are outgrowths of traditional techniques for performing manual image registration, in which an operator chooses corresponding control points (CP) in images, such as a cross or steeple on a church or a geographic reference such as a rocky outcropping. When the number of control points exceeds the minimum required to define the appropriate transformation model, iterative algorithms like random sample consensus (RANSAC) can be used to estimate the parameters of a particular transformation type (e.g. affine) for registration of the images.

Generally, frequency-domain image registration methods find the transformation parameters for registration of the images while working in the frequency domain. Note, a given function or signal can be converted between the time and frequency domains with a pair of mathematical operators called a transform. An example is the Fourier transform, which converts the time function into a sum of sine waves of different frequencies, each of which represents a frequency component.

The 'spectrum' of frequency components is the frequency domain representation of the signal. Such methods work for detecting simple transformations, such as translation, rotation, and scaling. Applying a phase correlation method to a pair of images (i.e., the test image and the reference image) may produce a third image which contains a single peak. The location of this peak corresponds to the relative translation between the images. Unlike many spatial-domain algorithms, the phase correlation method is resilient to noise, occlusions, and other defects typical of medical or satellite images. Additionally, phase correlation method uses the fast Fourier transform to compute the cross-correlation between the test image and the reference image, generally resulting in large performance gains. The method can be extended to determine rotation and scaling differences between two images by first converting the images to log-polar coordinates. Due to properties of the Fourier transform, the rotation and scaling parameters can be determined in a manner invariant to translation.

Background—Phase Correlation Method

Phase correlation works by exploiting the shift property of Fourier transforms to map spatial domain translations to frequency domain linear functions. Let $I_T(x, y)$, $I_R(x, y)$ represent the test image and reference image, respectively, and assume the test image $(I_T)$ is a translation of the reference image $(I_R)$:

$$I_T(x,y) = I_R(x+\Delta x, y+\Delta y) \qquad \text{(Equation 1)}$$

Denote the Fourier transform operator by $\mathfrak{F}$. According to the Fourier shift theorem, then:

$$\mathfrak{F}\{I_T\}(\omega_x, \omega_y) = e^{i(\omega_x \Delta x + \omega_y \Delta y)} \mathfrak{F}\{I_R\}(\omega_x, \omega_y) \qquad \text{(Equation 2)}$$

The complex exponential factor in Equation (2) represents a two-dimensional linear phase function. In the spatial domain, the two-dimensional linear phase function corresponds to a delta function since:

$$\mathfrak{F}^{-1}\{e^{i(\omega_x \Delta x + \omega_y \Delta y)}\} = \delta(x+\Delta x, y+\Delta y). \qquad \text{(Equation 3)}$$

The phase correlation approach correlates pre-whitened versions of the test image $(I_T)$ and reference image $(I_R)$. In the frequency domain, the correlation output (denoted $C_\Phi$) takes the following form:

$$C_\Phi\{I_T, I_R\}(\omega_x, \omega_y) = \frac{\mathfrak{F}\{I_T\}(\omega_x, \omega_y) \mathfrak{F}^*\{I_R\}(\omega_x, \omega_y)}{|\mathfrak{F}\{I_T\}(\omega_x, \omega_y)||\mathfrak{F}^*\{I_R\}(\omega_x, \omega_y)|}. \qquad \text{(Equation 4)}$$

If the test image ($I_T$) is a translated version of the reference image ($I_R$) as in Equation (1), then substituting Equation (2) into Equation (4) yields:

$$C_\Phi\{I_T, I_R\}(\omega_x, \omega_y) =$$ (Equation 5)

$$\frac{e^{i(\omega_x \Delta x + \omega_y \Delta y)} \Im\{I_R\}(\omega_x, \omega_y) \Im^*\{I_R\}(\omega_x, \omega_y)}{|\Im\{I_R\}(\omega_x, \omega_y)||\Im^*\{I_R\}(\omega_x, \omega_y)|} = e^{i(\omega_x \Delta x + \omega_y \Delta y)}$$

and thus $$\Im^{-1}\{C_{101}\{I_T, I_R\}(\omega_x, \omega_y)\} = \delta(x + \Delta x, y + \Delta y).$$ (Equation 6)

According to Equation (6), the correlation corresponds to an impulse function in the spatial domain.

In practice, the spatial domain peak in Equation (6) may be spread over multiple pixels, due to noise effects, slight non-translational alignment errors between the test image ($I_T$) and reference image ($I_R$), and non-integer translational offsets. Because of the duality between spatial and frequency domains, an alternative approach to translation estimation is to use Equation (5) to determine the two-dimensional linear phase function in the frequency domain.

Linear regression analysis has been used in an attempt to fit a plane to the two-dimensional linear phase function. However, use of linear regression can be problematic due to problems with surface fitting noisy data and phase wrapping issues.

SUMMARY

Inasmuch as previous attempts have failed to register imagery under a wide range of geometric distortions, scene content variations, noise, and phenomenology differences, an improved method for registering or matching images is, therefore, needed. The present disclosure addresses these and other issues by establishing a phase function that sharpens image information content through an enhanced phase correlation technique for resilient and robust image registration.

According to one aspect of the present disclosure, an embodiment may provide a method for registering or matching images having fundamentally different characteristics, wherein the improvement comprises the step of using enhanced phase correlation (EPC) combined with a coarse sensor model to hypothesize a projection and match using a custom match metric to develop a best solution. The image registration system and method matches images having fundamentally different characteristics. The system and method may be operated on a non-transitory computer-readable medium storing a plurality of instructions which when executed by one or more processors causes the one or more processors to perform the image registration method utilizing the enhanced phase correlation method.

According to one aspect of the present disclosure, an enhanced phase correlation (EPC) approach is combined with a coarse sensor model to hypothesize and match the phase function by searching the sensor model parameter space and matching using EPC therewith, and combined with a custom match metric to obtain the best solution. The search is done hierarchically and if the solution search space includes the true solution, the system will find that solution. In one particular aspect, the EPC drives the solution, but may also include some nuances to the application of the EPC to various imaging scenarios using image pre-processing techniques. The EPC is a fast Fourier transform (FFT)-based phase correlation (in which the images are fully whitened by setting the magnitudes to a constant) followed by a non-linear filter. This approach has been found to be extremely robust for registering or matching SAR, infrared (IR), EO, video, and x-ray imagery.

In accordance with yet another aspect, an embodiment of the present disclosure may provide a non-transitory computer-readable medium storing a plurality of instructions which when executed by one or more processors causes the one or more processors to perform a method for image registration utilizing an enhanced phase correlation, the plurality of instructions for the enhanced phase correlation (EPC) comprising: instructions for smoothing correlation output between a test image and a reference image by multiplying an amplitude shaping function with an absolute amplitude of the test image. This embodiment, may further include instructions for remapping image data to create a hypothesized projection, wherein remapping the image data is accomplished by a coarse sensor model; wherein the coarse sensor model is not an exact sensor model. The coarse sensor model may be a pinhole camera free of any lens; and wherein the reference image is captured from an electro-optical (EO) camera.

Remapping the image data transforms the image data to appear as if the images was taken from a direct overhead camera. The plurality of instructions further comprises instructions for performing one EPC operation and then checking an EPC correlation surface for a valid correlation peak. The instructions may perform one EPC operation and then check the EPC correlation surface for the valid correlation peak, further comprises instructions for determining a correct match between the test image and the reference image with a verification metric (VM). The VM measures the signal-to-noise ratio of a peak of the EPC correlation surface to area surrounding the peak. The VM determines the shape of the peak of the correlation surface is a uni-modal circular peak. The plurality of instructions may further comprises an instruction for establishing a threshold and making an image registration verity decision, wherein the VM determines a Z-score normalization of a maximum phase correlation value.

Also, there may be an instruction for establishing a threshold, wherein if the Z-score normalization of the maximum phase correlation is below the threshold then the registration solution is verified as correct. There may be instructions for looping the one EPC operation over a limited range of scale and rotation. The instructions may also establish a hierarchical search pattern to increasing loop rate. The looping can be performed on parallel threads.

A method of enhanced phase correlation image registration comprising the steps of: capturing a reference image from camera on a vehicle; capturing a test image from the camera; overlaying the test image and the reference image in a processor in a computer; registering the test image and the reference image with phase correlation techniques, wherein the phase correlation techniques includes, in order, Equation 1 through Equation 4; registering the test image and the reference image with phase correlation techniques, wherein the phase correlation techniques includes, in order, Equation 7 through Equation 8; developing a correlation output representation of Y-Direction shift and X-Direction shift between the test image and the reference image; wherein the correlation output includes a correlation peak.

In accordance with yet another aspect, an embodiment may provide a phase correlation method for image registration including the steps of mapping spatial domain translations to frequency domain linear functions by first obtaining a reference image and a test image which is a translation of the reference image (Equation 1), then, denoting a Fourier transform operator (Equation 2), wherein a complex exponential factor represents a two-dimensional linear phase function corresponding to a spatial domain delta function (Equation 3), and then, obtaining a correlation output between the reference image and the test image in the frequency domain (Equation 4), wherein the improvement comprises the step of: smoothing the correlation output by multiplying an amplitude shaping function with the test image amplitude (Equation 7 and Equation 8); and verifying a match between the test image and the reference image. An additional step may include solving translation errors for both frame-to-frame and frame-to-reference video images taken. Another step may include solving mis-registration errors when combined with a sensor parameter search paradigm. Another step may include reducing initial translational misalignment to strengthen the image registration solution. Another step may include, when used in combination with shape-based object recognition, the additional step of: recognizing a target automatically through parametric 3D models using common geometry models for multiple modalities. Another step may include, when used in combination with shape-based object recognition, the additional steps of: finding a site location in a broad area search of panchromatic satellite imagery; and locating a target within 1 meter resolution satellite imagery using the improvement.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Portions of the BACKGROUND in this present disclosure are referred to herein for brevity rather than re-writing those portions. It is to be understood that the present disclosure relates to improvements to phase correlation methods to create a more robust image registration technique by developing an enhanced phase function through an enhanced phase correlation technique.

Figure 1:
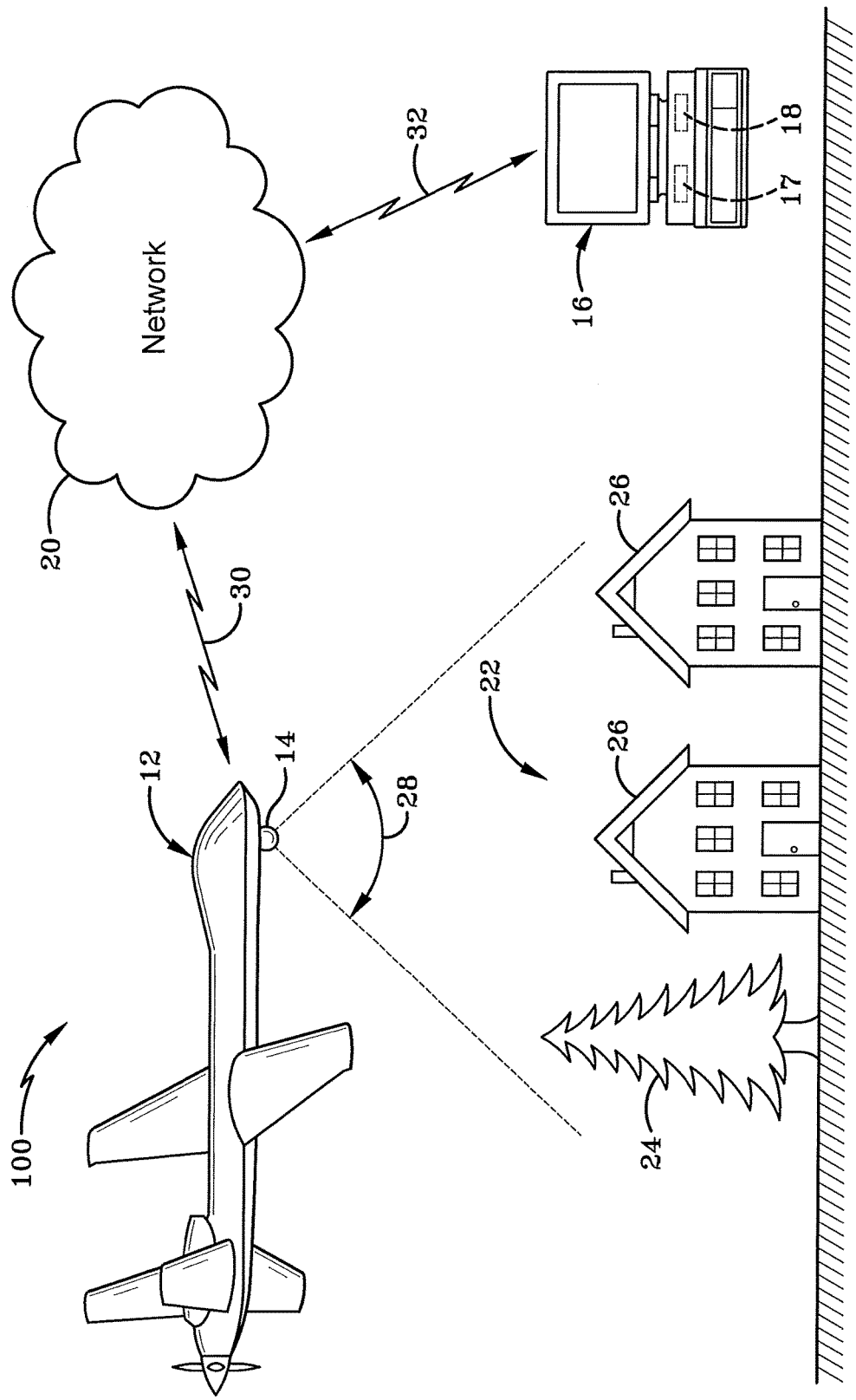
FIG. 1 is a general diagrammatic view of a broad embodiment of an image registration system.

As depicted in FIG. 1, an image registering or matching system is broadly depicted as 100. Image registering system 100 may include a vehicle 12 carrying a camera 14, a computer 16 operatively coupled to a memory 17 and a processor 18, a network connection 20, and a geographic landscape 22 which may include natural features 24, such as trees or mountains, or manmade features 26, such as buildings, roads, or bridges, etc., which are viewable from vehicle 12 through a viewing angle 28 of camera 14.

In one particular embodiment, vehicle 12 is a flying device configured to move above the geographic landscape 22. Vehicle may be a drone or unmanned aerial vehicle (UAV) as one having ordinary skill in the art would understand. In another example, the vehicle refers to planes, helicopters, zeppelins, balloons, space shuttles, and the like while a further example includes missiles, rockets, and guided munitions. Camera 14 is carried by vehicle 12 and may be selected from a group of known cameras capable of capturing test images and reference images in a wide variety of electromagnetic spectrum for image registration. For example, camera 14 may capture SAR, IR, EO, LIDAR, video, and x-ray imagery, amongst many others as one would easily understand. The camera 14 in one example is powered from the vehicle and in another example the camera has its own power source.

Network 20 allows the transmittal of digital data from camera 14 to processor 18 and memory 17 in computer 16.

Network 20 is preferably an encrypted and secure high-speed internet. When camera 14 captures a reference image and a test image, they are sent to network 20 via a first network connection 30. Processor 18 is operatively coupled to network 20 via a second network connection 32. Further, while computer 16 is depicted as remote from vehicle 12, it is entirely possibly computer 16 is carried by vehicle 12 such that the image registration process (described in greater detail below) occurring in memory 17 and processor 18 occurs onboard vehicle 12. In this latter embodiment, the image processing would be performed on the vehicle 12 and the network 20 refers to the internal network within the vehicle.

As will be described in greater detail below, the test image ($I_T$) and the reference image ($I_R$) will be matched (i.e., registered) in processor 18 utilizing an enhanced phase correlation process which has heretofore been unknown. To accomplish the image registration, computer 16 and processor 18 may operate in conjunction with memory 17, a plurality of input/output ports which may be operably connected by a bus.

In one particular embodiment, the computer 16 includes an enhanced phase correlation logic configured to robustly register SAR, infrared (IR), EO, video, and x-ray imagery. In different examples, the enhanced phase correlation logic may be implemented in hardware, software, firmware, and/or combinations thereof. Thus, the enhanced phase correlation logic may provide means (e.g., hardware, software, firmware) of registering imagery by performing a hierarchical search and match utilizing the techniques provided in further detail below (i.e. See Equation (8) infra).

Computer 16 operates in the network 20 environment and thus may be connected to other the network devices (not shown) via the i/o interfaces, and/or the i/o ports. Through the network 20, the computer 16 may be logically connected to other remote computers. Networks with which the computer may interact include, but are not limited to, a local area network (LAN), a wide area network (WAN), and other networks. The networks may be wired and/or wireless networks.

Memory 17 and processor 18 operate collectively to define a non-transitory computer-readable medium storing a plurality of instructions which when executed by one or more processors causes the one or more processors to perform a method for image registration utilizing an enhanced phase correlation. The plurality of instructions for the enhanced phase correlation may include, amongst other things, instructions for smoothing correlation output (denoted $C_{101}$; See Equation (7) and Equation (8), infra.) through a multiplication step, wherein the multiplication step includes multiplying an amplitude shaping function with an absolute amplitude of the test image. The plurality of instructions may include instructions for running an image registration verification metric. The plurality of instructions may include instructions for running a patch-based edge matching approach or a consistency approach as a type of verification metric. Further, the instructions may run a Z-score normalization of the maximum phase correlation value as part of the image registration verification metric.

Processor 18 and memory 17 continue to work collectively with the instructions after they have been executed to combine the correlation output with a coarse (approximate) sensor model. The plurality of instructions operating the enhanced phase correlation in image registration system 100 does not require an exact sensor model which is the current state of the art.

The next portions of the present disclosure discusses the enhanced phase correlation for image registration and details its results from real-world testing.

Enhanced Phase Correlation (EPC)

The EPC of the present disclosure modifies Equation (4) (See BACKGROUND supra) by smoothing the correlation output ($C_\Phi$) through multiplication. The EPC multiplies the amplitude shaping function (i.e., the numerator of Equation (4)) with the absolute amplitude of the test image, i.e., $$C_\Phi\{I_T, I_R\}(\omega_x, \omega_y) = \qquad \text{Equation (7)}$$
$$\frac{\mathfrak{I}\{I_T\}(\omega_x, \omega_y)\mathfrak{I}^*\{I_R\}(\omega_x, \omega_y)|\mathfrak{I}\{I_T\}(\omega_x, \omega_y)|}{|\mathfrak{I}\{I_T\}(\omega_x, \omega_y)||\mathfrak{I}^*\{I_R\}(\omega_x, \omega_y)|}$$

And simplifying (7) yields the half-whitened form of the EPC which is the efficient implementation of the present disclosure, namely:

$$C_\Phi\{I_T, I_R\}(\omega_x, \omega_y) = \frac{\mathfrak{I}\{I_T\}(\omega_x, \omega_y)\mathfrak{I}^*\{I_R\}(\omega_x, \omega_y)}{|\mathfrak{I}^*\{I_R\}(\omega_x, \omega_y)|}. \qquad \text{Equation (8)}$$

Equation (8) is performed in accordance with a particular aspect of the present disclosure. Equation (8) provides robust image matching and registration solutions for a wide range of applications.

Equation (8) smooths the correlation output, which in turn filters out (i.e. removes) many false noise peaks in the correlation surface. Thus, Equation (8) improves the likelihood of the system finding the true solution. Additionally, Equation (8) de-sensitizes (i.e., makes less sensitive) the EPC to allow inexact geometries. This makes the system tolerant to small amounts of rotation and scale errors. Both of these factors enable robust solutions.

For the generalization of the EPC to cross-modality sensor data obtained from camera 14 (e.g., SAR-to-IR; IR-to-EO; etc), at least one pre-conditioning filter may be utilized to improve image registration performance when the imagery is highly uncorrelated (test to reference).

For SAR-to-EO and EO-to-EO, no conditioning is necessary for most applications. For IR-to-EO, a gradient filter is applied to both the test image and the reference image, prior to EPC, to improve performance on contrast-reversed edges. For most sensor data, a pre-conditioning step can be determined based on overall correlation of the test image with the reference image.

After the EPC has solved for the correlation output through Equation (8), the results are filtered. Particularly, the inclusion of a filter on the back end makes it more robust and higher performance.

The EPC method is combined with a coarse sensor model. In order to find a correct mapping, system 100 utilizes a coarse sensor model (for EO it is a pinhole camera) to remap the image data to a hypothesized projection. In one embodiment the coarse sensor model is applied prior to calculating EPC. If the projection is wrong, system 100 gets a very poor EPC correlation surface and metric. If the projection is correct, system 100 will get a very good EPC correlation surface and metric. The coarse sensor model is necessary to put the image pixels into correct projection to compare to an ortho-reference image base. One exemplary advantage and benefit of system 100 is that only a coarse (approximate) camera sensor model is required because the EPC correlation is forgiving to minor differences. If higher accuracy is required, an exact sensor model would be used in a follow-on stage of processing.

The coarse sensor model remaps the camera view to the overhead reference view. This is used for the image registration using the EPC. Other image registration approaches use feature extraction for control points and then determination of a consistent mapping between the control points to register the images (and this classical approach does not require a coarse sensor model). High performance computing (multi-core, GPU and cloud architectures) is used in one embodiment, and system 100 utilizes the EPC approach that should outperform other known registration approaches.

The hypothesis projection and match solving method of system 100 operates to register images image using a Fast Fourier Transform for correlation. System 100 transforms any image data (from a camera) so that the image appears (to the viewer) as if the images was taken from a nadir (directly overhead) camera. This is completed by the coarse sensor model described above. In these instances, all system 100 needs to search over is magnification/scale (size), and rotation (relative to north). An x-translation and a y-translation are inherent in the FFT correlation surface, wherein the peak determines the x and y translation offsets. For many image applications, the scale (FOV and altitude), rotation (compass heading) are known and may have a small degree of uncertainty error, thus system 100 searches over a known and limited range of scale and rotations. For each specific instance of scale and rotation, system 100 performs one EPC operation and then checks the EPC correlation surface for a valid correlation peak. The metric or measure of a good peak is the strength of the highest peak relative to the surrounding surface (which is desired to be low). A valid peak will have a very high amplitude peak and a very low surrounding flat surface (See FIG. 7D). After all EPC steps with specific instances of scale and rotation have been completed, system 100 chooses the best overall EPC metric and as a result get the correct scale, rotation, x-offset and y-offset.

The hypothesis/search method operates within the sensor model parameter space. In doing so, the process loops over the limited range of scale and rotation. System 100 utilizes a hierarchical search speeding up this loop. For parallel computing architectures, the hypothesis search over the sensor model parameter space (scale and rotation) can be performed on parallel threads.

The final decision on whether or not system 100 has found a viable match is determined by the verification metric technique (described in greater detail below). This verification metric technique measures the signal-to-noise ratio of the EPC correlation surface peak to the surrounding area of the peak. System 100 also evaluates the shape of the peak of the correlation surface (i.e., is it a uni-modal circular peak).

The aforementioned hypothesis projection search and match method may be implemented in processor 18 and memory 17 on computer 16. Particularly, System 100 may include instructions stored in memory 17 and ran on processor 18 for performing a hypothesis projection search and match method in accordance with the features described above. In doing so, the instructions may first create a hypothesis projection with a coarse sensor model. When camera 14 is an EO camera, the coarse sensor model is a pinhole camera through which camera 14 captures the test image. The pinhole camera described herein is a simple camera without a lens and with a single small aperture. The instructions may then remap the image data to see if it matches the hypothesized projection. If the instructions determine that the there is a poor correlation between the EPC correlation surface and a verification metric, then the hypothesized projection is incorrect. If the instructions determine that the there is a high correlation between the EPC correlation surface and a verification metric, then the hypothesized projection is correct.

Image Registration Verification Metric

Determining the correctness of a registration solution in the absence of ground truth is a challenging problem. To address this problem, a verification metric (VM) was developed for feature-based image registration to provide a confidence value for registration solution verity in the absence of ground truth. The VM was used in an iterative registration approach to choose an appropriate registration solution from a set of solutions generated by using different feature extractor parameter values. Subsequently, the VM was adapted for use in a registration approach using phase correlation. In this instance, the VM becomes equivalent to the peak-to-side lobe ratio defined for the phase correlation surface. Thus, the VM establishes a type of match metric associated with a correlation surface peak value as a way to judge the effectiveness of the image registration.

In accordance with the present disclosure, the teaching herein expands the use of VM as match metrics. Particularly, image registration system 100 utilizes the similarity measure or match metric in a registration technique to establish a threshold and make an image registration verity decision. An analysis of similarity measures used for image registration are identified below and described in association with FIG. 2 through FIG. 7.

As an alternative to a verification metric, consistency may be used; for example, insensitivity of the final registration solution to process parameter values, control point error offsets, root mean square of grayscale values of registered pixels, and thresholding of the spatial domain peak of the inverse Fourier transformed phase correlation surface have also been used as verification metrics.

In accordance with the present disclosure, a patch-based edge matching approach defines statistical confidence regions which characterize the probability that other translation hypotheses are consistent with the best translation. Confidence region size can be used to gauge registration verity.

The VM may include a Z-score normalization of the maximum phase correlation value. Large VM values generally indicate higher confidence in the correctness of the registration solution. Small values cast doubt on the truth of the solution. Use of a Z-score normalization implicitly assumes a Gaussian statistical model for the phase correlation coefficients.

Figure 7A:
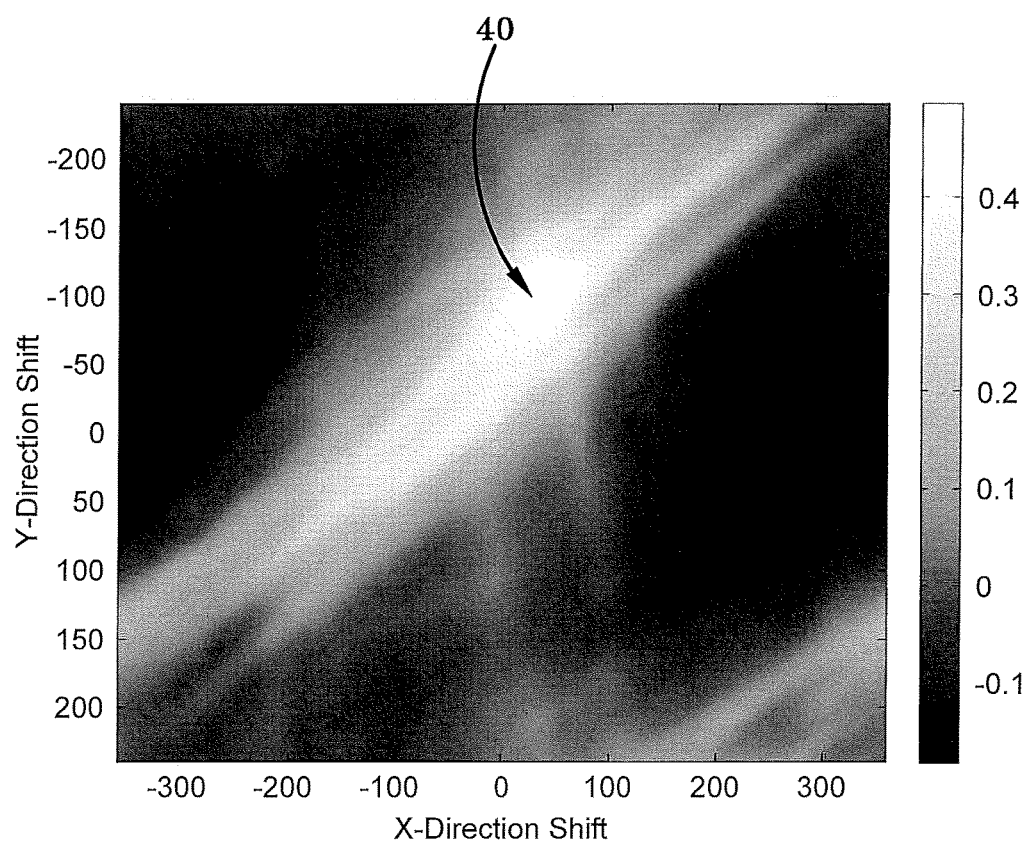
FIG. 7(a) depicts the correlation surface of the AC registration.
Figure 7B:
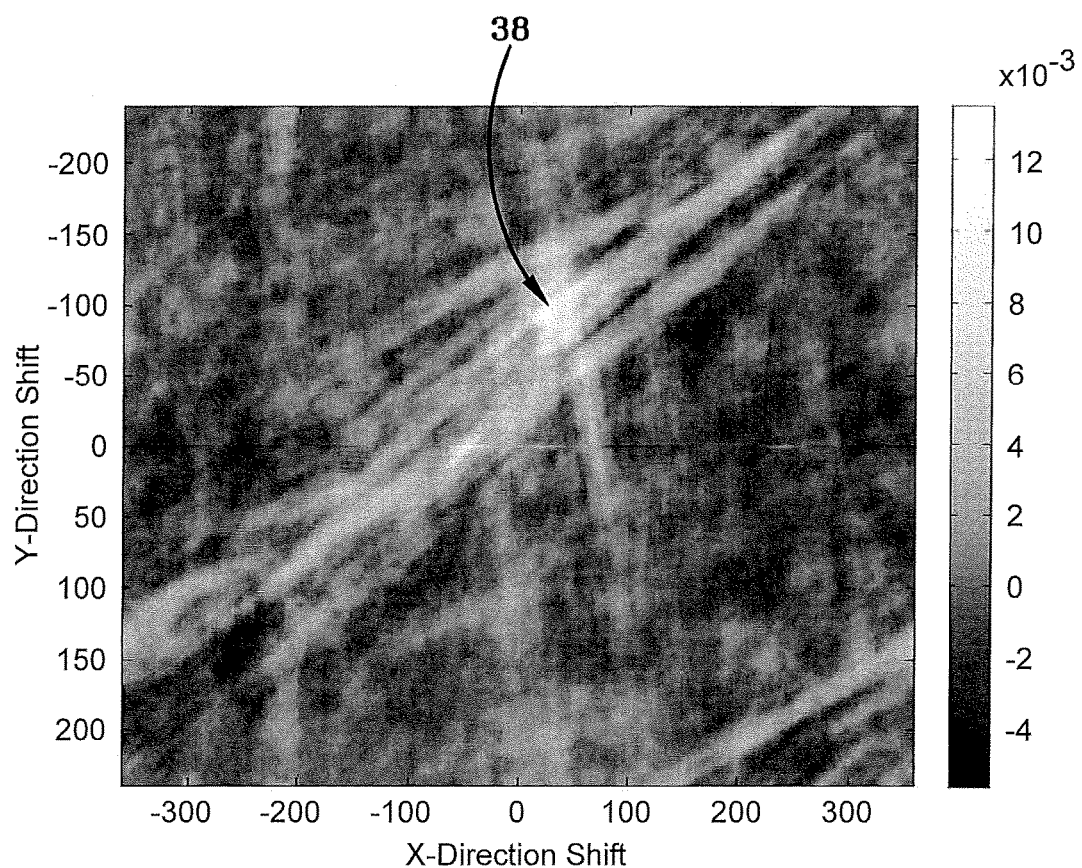
FIG. 7(b) depicts the correlation surface of the enhanced phase correlation registration.
Figure 7C:
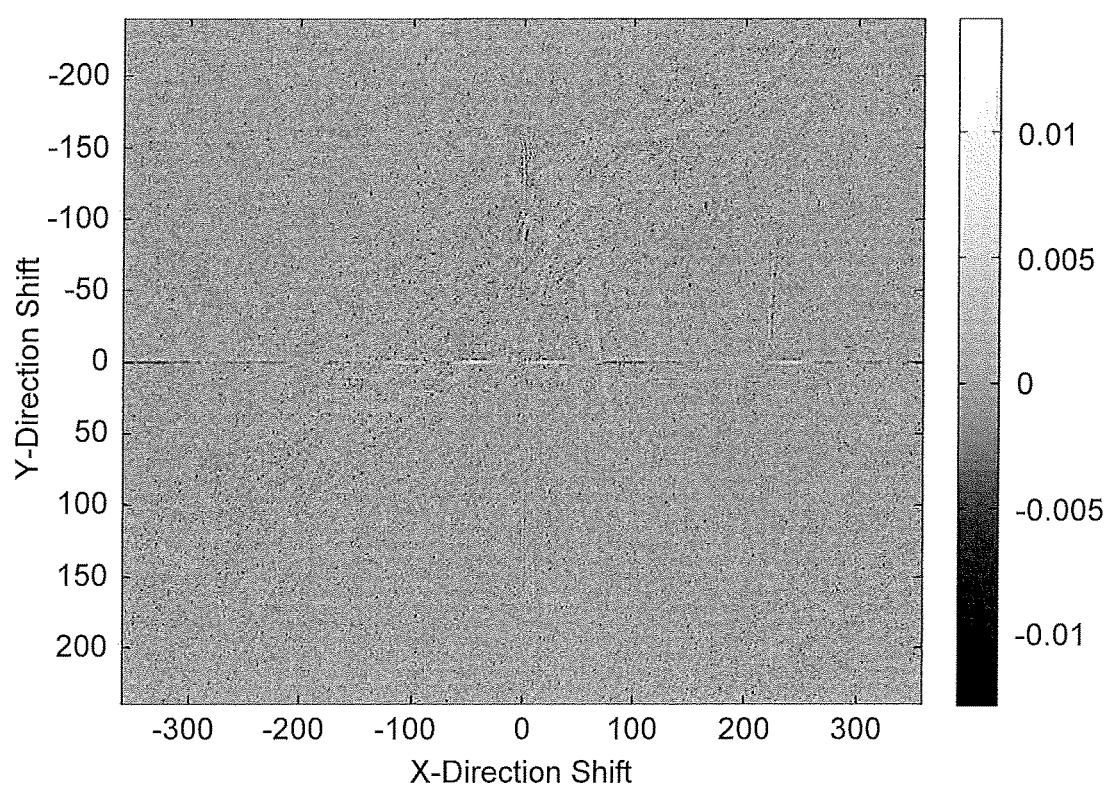
FIG. 7(c) depicts the correlation surface of the PC registration.
Figure 7D:
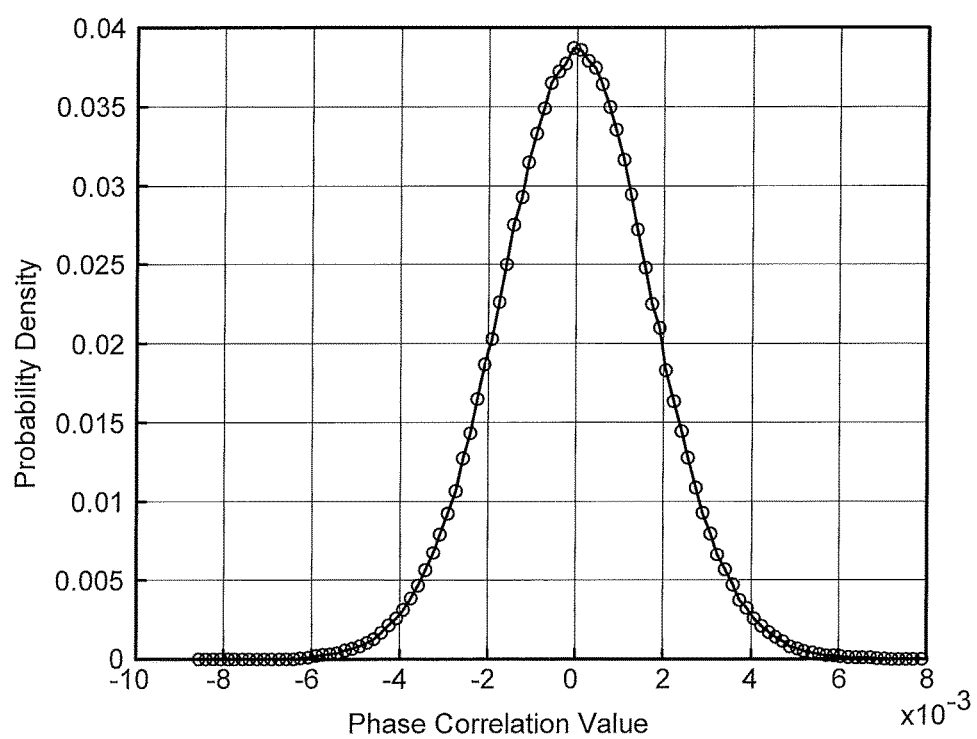
FIG. 7(d) is a plotted graph representing a normalized histogram of phase correlation coefficients.

FIG. 7(d) contains a normalized histogram of the coefficients in the phase correlation surface shown in FIG. 7(c). FIG. 7(d) indicates that, at least for this example, a Gaussian model is a reasonable modeling assumption.

The VM may have a threshold to make a decision on registration solution verity. Appropriate threshold selection can be difficult, depending upon, for example, scene content characteristics, image quality, and seasonal effects.

The aforementioned VM utilized in the match method may be implemented in processor 18 and memory 17 on computer 16. Particularly, System 100 may include instructions stored in memory 17 and run on processor 18 for establishing a threshold and making an image registration verity decision. Further, the instructions for the VM matching may determine a Z-score normalization of the maximum phase correlation value. If the instructions determine that there is a large VM value, then it there is a high confidence in the correctness of the registration solution. If the instructions determine that there is a small VM value, then there is a low confidence in the truth of the solution.

Figure 2A:
FIG. 2(a) depicts a reference image obtained from a first set Aerial Video Frames.
Figure 2B:
FIG. 2(b) depicts a test image obtained from the first set Aerial Video Frames.
Figure 8:
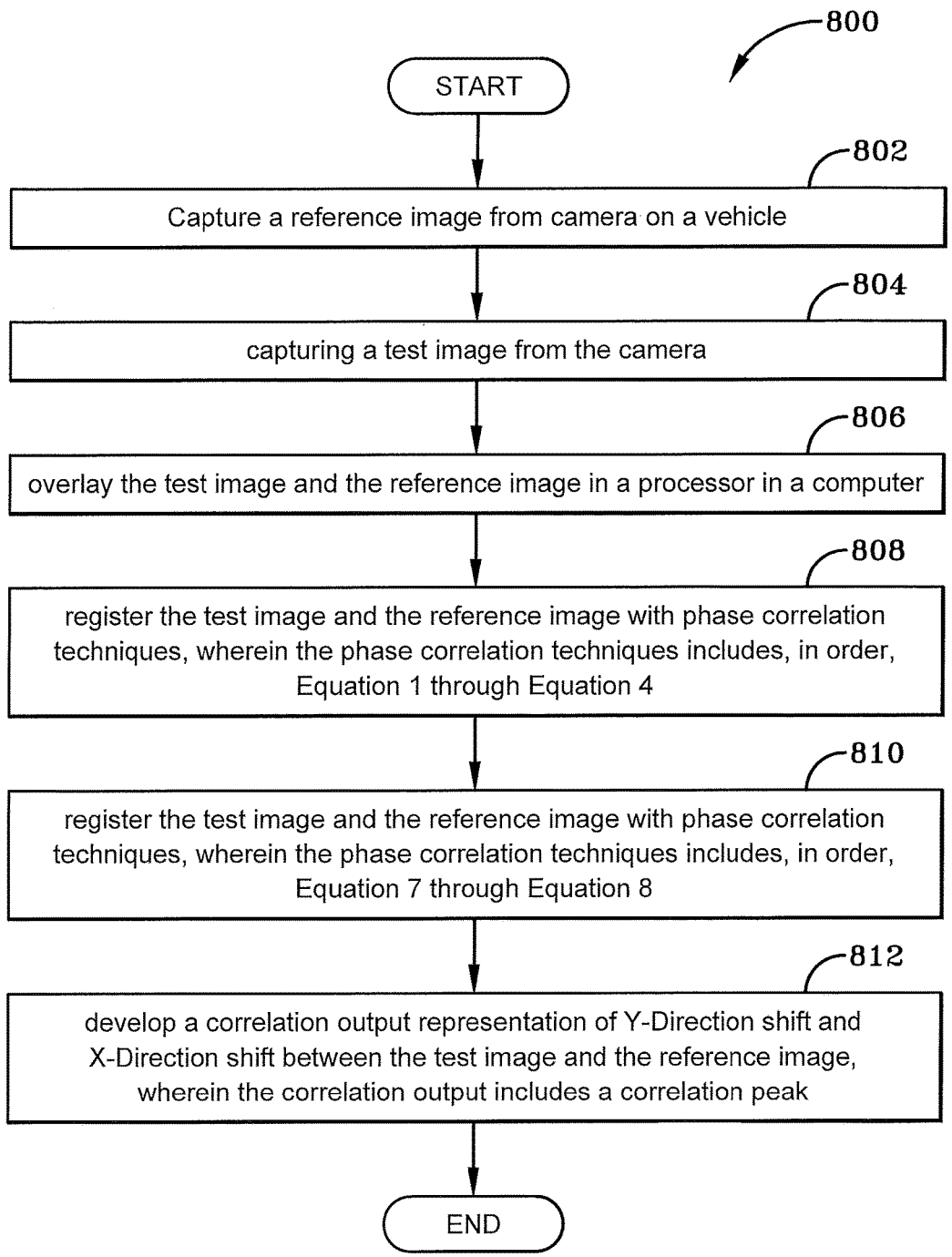
FIG. 8 is a flow chart depicting an exemplary method of enhanced phase correlation for image registration.

Reference is now made to the EPC method/flowchart of FIG. 8 and the associated exemplary results in the FIGS. 1-7. First, the EPC method may capture a reference image from camera 14, shown generally at 802. One exemplary reference image $I_R$ is depicted in FIG. 2(*a*). The EPC method may then capture a test image $I_T$ from camera 14, shown generally at 804. One exemplary reference image is depicted in FIG. 2(*b*).

The EPC method overlays the test image and the reference image in the processor 18 as a pre-conditioning step, shown generally at 806. Then, the EPC method runs, within the processor 18, registration of the test image and the reference image through traditional phase correlation techniques Equation 1 through Equation 4, shown generally at 808.

After running Equation 4 in the processor, the EPC method then runs, in order, Equation 7 and then Equation 8, shown generally at 810 to develop a correlation output representation of Y-Direction shift and X-Direction shift, shown generally at 812. The correlation output of the EPC method is identified FIG. 7(*b*) and the correlation peak 38 is depicted as a relatively pure white dot adjacent a scrambled shading representation of correlation outputs. The smaller the pure white dot, the higher the correlation. For example the white dot (correlation peak 40) in FIG. 7(*a*) representing an AC correlation output is larger than the white dot (correlation peak 38) in FIG. 7(*b*).

Registration Example Results

In this section example results are presented that demonstrate the effectiveness of Enhanced Phase Correlation (EPC) in comparison to Amplitude Correlation (AC) and traditional Phase Correlation (PC) for removal of gross translational alignment errors. The examples are explained in conjunction with aerial video frame-to-frame registration and video frame-to-reference image registration.

Figure 3A:
FIG. 3(a) depicts ortho-rectified reference image obtained from a second set of Aerial Video Frames.
Figure 3B:
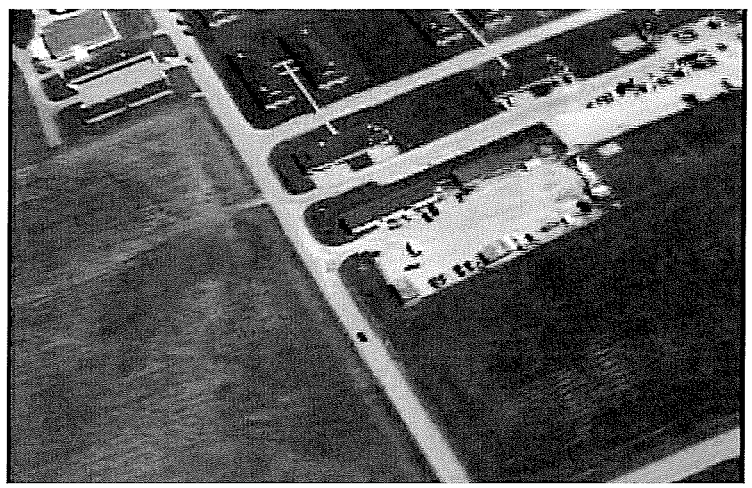
FIG. 3(b) depicts a test video frame image obtained from the second set of Aerial Video Frames.

Recall, FIG. 2 contains two video frames, a reference frame image (FIG. 2(*a*)) and a test frame image (FIG. 2(*b*)). FIG. 3 contains two video frames, an ortho-rectified reference video frame image (FIG. 3(*a*)) and a test video frame image (FIG. 3(*b*)).

A first exemplary background scenario presents an example in which classical amplitude correlation (AC) and phase correlation (PC) registration fail. Each of the AC correlation and PC correlation image registration techniques consists of performing one of the correlation operations using the test and reference imagery, and choosing the translation which maximizes the VM.

Figure 4A:
FIG. 4(a) depicts overlaid imagery of pre-registration video frame images from the second set of Aerial Video Frames.
Figure 4B:
FIG. 4(b) depicts overlaid imagery of post windowed PC registration of video frame images from the second set of Aerial Video Frames.
Figure 4C:
FIG. 4(c) depicts overlaid imagery of post windowed AC registration of video frame images from the second set of Aerial Video Frames.

The video frame image in FIG. 3(*b*) is cropped and ground-projected using a sensor model, and registered using classical phase correlation (PC) and traditional amplitude correlation (AC). The translations corresponding to the maximum VM value are taken as the registration solution. The registration solutions, along with the pre-registration imagery, in the form of overlaid imagery, are contained in FIG. 4(*a*), FIG. 4(*b*), and FIG. 4(*c*). Particularly, FIG. 4(*a*) depicts overlaid imagery of pre-registration video frame images from the second set of Aerial Video Frames. FIG. 4(*b*) depicts overlaid imagery of post windowed PC registration of video frame images from the second set of Aerial Video Frames. FIG. 4(*c*) depicts overlaid imagery of post windowed AC registration of video frame images from the second set of Aerial Video Frames.

The pre-registration overlay (FIG. 4(*a*)) shows the initial misalignment between the test image (FIG. 3(*b*)) and the reference image (FIG. 3(*a*)) using only the image metadata.

Due to the large time difference between the times of the reference image (FIG. 3(*a*)) and the test image (FIG. 3(*b*)), a physical differences in the images exist (e.g., new paved areas). Gaussian windowing of the test image (FIG. 3(*a*)), prior to zero-padding, was used to reduce edge effects at the image borders.

Figure 5A:
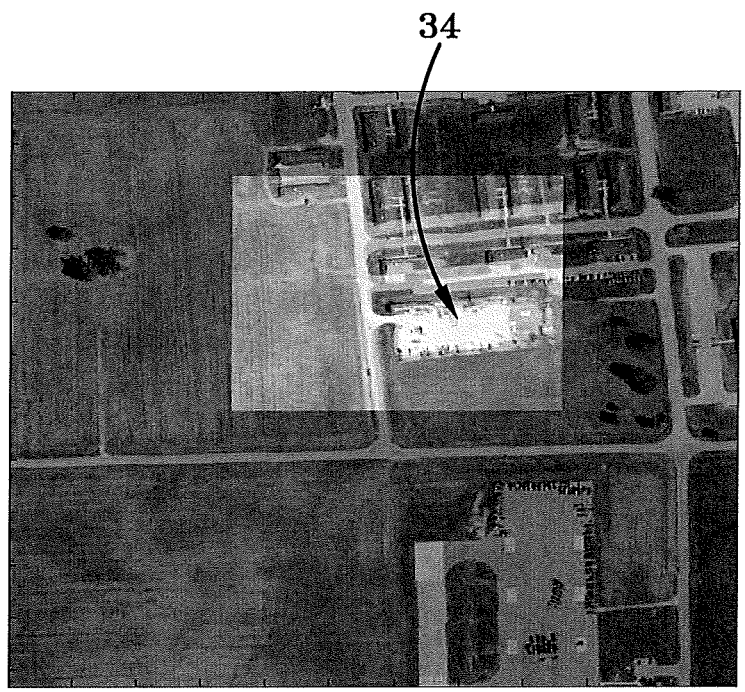
FIG. 5(a) depicts overlaid imagery of a post non-windowed enhanced phase correlation registration of video frame images from the second set of Aerial Video Frames.
Figure 5B:
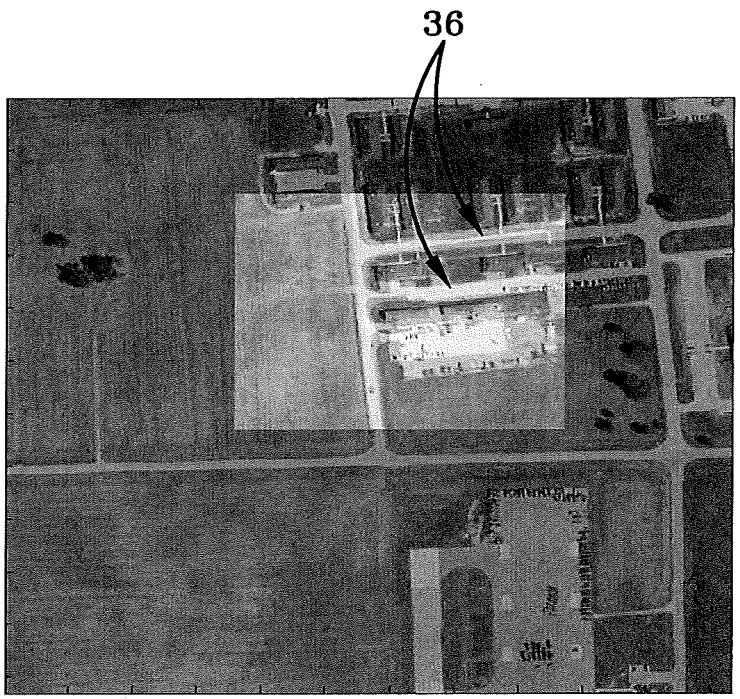
FIG. 5(b) depicts overlaid imagery of a post windowed enhanced phase correlation registration of video frame images from the second set of Aerial Video Frames.
Figure 6A:
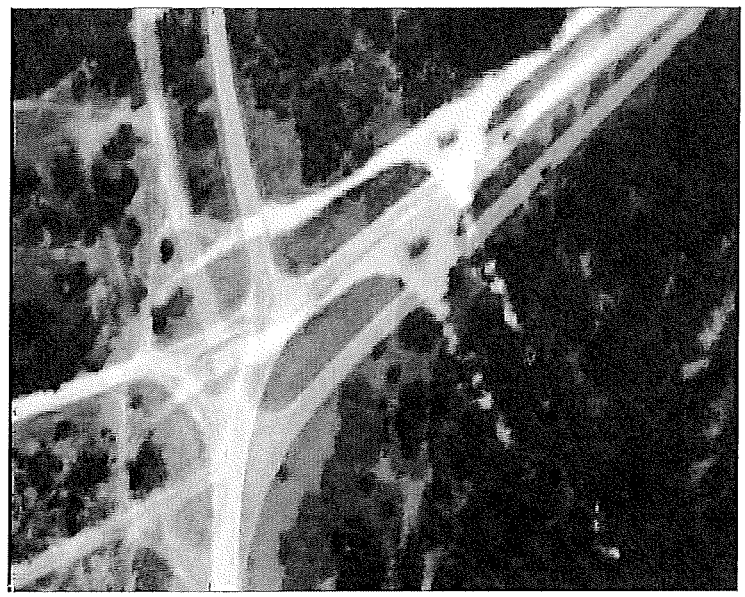
FIG. 6(a) depicts overlaid imagery of pre-registration video frame images from the first set of Aerial Video Frames.
Figure 6B:
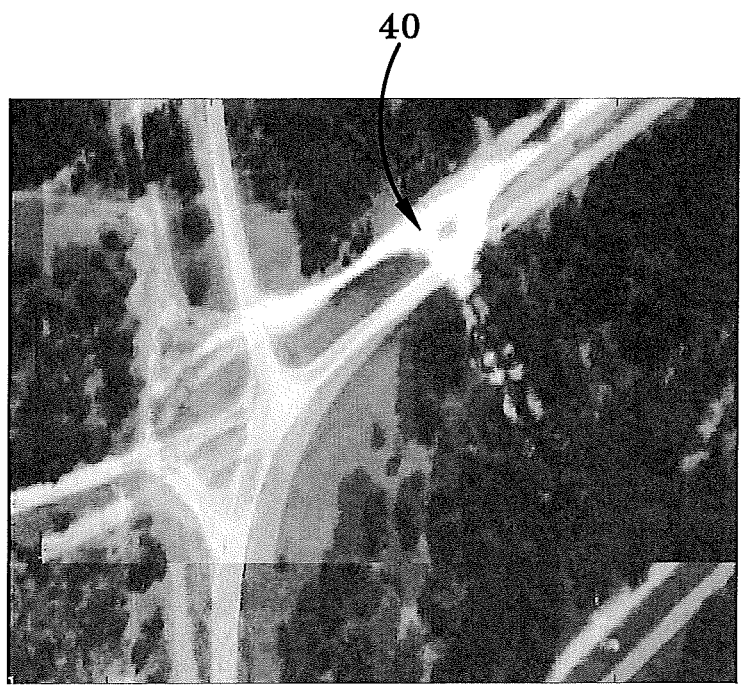
FIG. 6(b) depicts overlaid imagery of post AC registration video frame images from the first set of Aerial Video Frames.
Figure 6C:
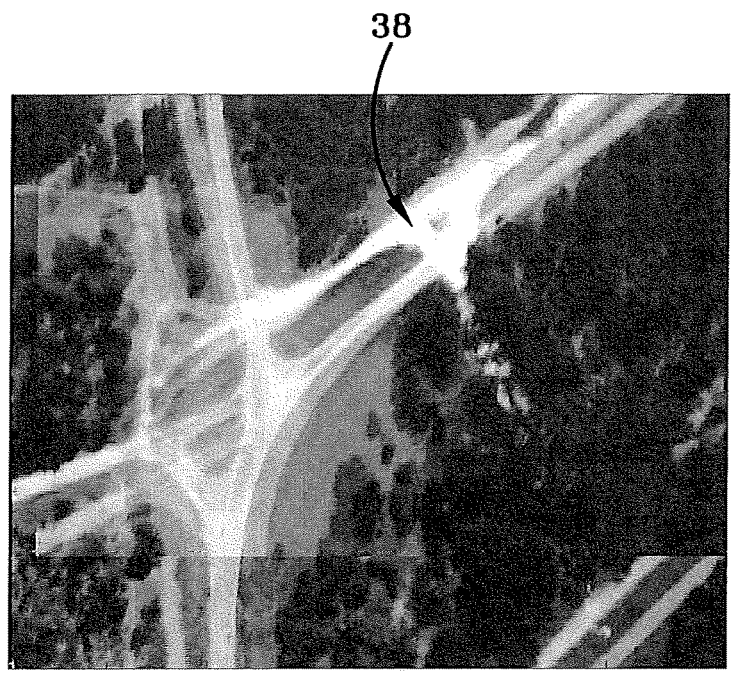
FIG. 6(c) depicts overlaid imagery of post enhanced phase correlation registration video frame images from the first set of Aerial Video Frames.
Figure 6D:
FIG. 6(d) depicts overlaid imagery of post PC registration video frame images from the first set of Aerial Video Frames.

Without this windowing, the registered solutions for PC and AC lock onto the image borders. FIG. 5 contains windowed and un-windowed solutions for EPC. Particularly, FIG. 5(*a*) depicts overlaid imagery of a post non-windowed enhanced phase correlation registration of video frame images from the second set of Aerial Video Frames. FIG. 5(*b*) depicts overlaid imagery of a post windowed enhanced phase correlation registration of video frame images from the second set of Aerial Video Frames.

FIG. 4(*b*) and FIG. 4(*c*) depict that registration fails for the "classical" AC and PC correlation techniques, respectively.

FIG. 5(*a*) and FIG. 5(*b*) depict that with or without windowing, respectively, the EPC implemented in image registration system 100 provides correct gross translation-only registration solutions. The registration solutions in FIG. 5 are only slightly different. In FIG. 5(*a*), the registration locks onto the parking lot area 34. In FIG. 5(*b*), the registration locks onto the pair of generally parallel roads 36 above the parking lot.

FIG. 6 contains frame-to-frame registration results for the first set of images presented in FIG. 2; including the pre-registration overlay (FIG. 6(*a*), and results for un-windowed AC (FIG. 6(*b*)), and EPC (FIG. 6(*c*)), and PC (FIG. 6(*d*)). More particularly, FIG. 6(*a*) depicts overlaid imagery of pre-registration video frame images from the first set of Aerial Video Frames. FIG. 6(*b*) depicts overlaid imagery of post AC registration video frame images from the first set of Aerial Video Frames. FIG. 6(*c*) depicts overlaid imagery of post enhanced phase correlation registration video frame images from the first set of Aerial Video Frames. FIG. 6(*d*) depicts overlaid imagery of post PC registration video frame images from the first set of Aerial Video Frames.

In this case both AC (FIG. 6(*b*)) and EPC (FIG. 6(*c*)) provide registration solutions which reduce the initial translational misalignment, whereas PC (FIG. 6(*d*)) misregisters, thus fails. Despite the fact the AC (FIG. 6(*b*)) also produces a correct registration solution, the EPC approach (FIG. 6(*c*)) is preferred because it provides a sharper and higher relative correlation peak 38 than the AC correlation peak 40 in FIG. 6(*b*). The sharper correlation peak 38 implies that there is more certainty in the estimate of the true peak location. The higher relative peak also offers more robustness to noise.

FIG. 7 contains the associated correlation surfaces for AC (FIG. 7(*a*), EPC (FIG. 7(*b*)), and PC (FIG. 7(*c*)). It is well known that AC (FIG. 7(*a*)) can provide a wide main lobe, leading to difficulty in determining the location of the true peak. FIG. 7(*a*) illustrates this phenomenon; the AC correlation peak 40 is smeared across many locations. Although AC achieves the correct registration in this case, in other cases the smearing of the main peak may cause confounding with other high peaks resulting from noise, coincidental feature alignment, or periodic scene content effects, potentially resulting in misregistration.

In FIG. 7(*c*), the PC surface shows no discernable peaks. In this case the visible rotational misalignment along with any other projective errors in the video imagery causes PC to fail.

In accordance with the present disclosure, the EPC surface in FIG. 7(*b*) provides a tight, high correlation peak 38. The narrow width of the high correlation peak 38 established that registration accuracy will be high when the registration solution is correct. The height of the enhanced phase correlation peak 38 helps to reduce confusion with other peaks that may compete with the peak corresponding to the correct solution.

The image registration system 100 of the present disclosure provides an enhancement to traditional phase correlation (PC) that dramatically improves its practicability and applicability to image registration. Examples presented above detailed the ability of EPC to correctly solve for translation errors for both frame-to-frame and frame-to-reference for video taken from a small UAV (vehicle 12) platform. Not only can the enhanced phase correlation be used to solve translation-only errors, but if combined with a sensor parameter search paradigm, the EPC approach can also solve for the general misregistration error cases as well.

The image registration system 100 is extremely robust. In one implementation, system 100 was able to geo-register a full MAD98 set of 2100 SAR images to EO reference imagery with no failures.

This should be readily apparent as a surprising discovery to those having skill in the art, because in the preceding years of registration system development and comparisons with state-of-the-art registration techniques in a registration testbed, no system or even "smart" process was able to do better than a 70% success rate.

Thus, the image registration system and its matching technology may be applied to a gamut of other applications including: shape-based object recognition, wide area search for targets, making video trackers more robust, and sensor fusion.

Image registration often categorizes cases as easy, medium, or hard; as one having ordinarily skill in the art would appreciate. A prior art oriented fast and rotated brief (ORB)-based process was only able to reliably register the "easy" cases. Another conventional HART process was able to deal with "easy" and "medium". The EPC technique within image registration system 100, however, was able to register all three cases; easy, medium, and hard.

For shape-based matching, the EPC has enabled a new line of Automated Target Recognition (ATR) techniques based on 3D models and parametric 3D models using common geometry models for multiple modalities (EO, IR, SAR, LIDAR). It is currently the leading edge ATR for the Air Force Research Laboratory (AFRL) Hydra Vision program and is a cornerstone for Compact ATR and Sustainable Environments (CASE).

For shape-based matching, the EPC has also enabled a new capability to find sites (building complexes) or specific targets of interest in broad area search satellite imagery (in particular high resolution panchromatic imagery). For example, the image registration system 100 may locate a Boeing 777 in 1 meter satellite imagery (that is visible to the satellite) using the EPC system, with very low false alarm rates, due to the unique dimensions of the Boeing 777.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

What is claimed:

1. An image registration system including a camera to capture a test image, and the image registration system comprising a non-transitory computer-readable medium in operative communication with the camera and storing a plurality of instructions which when executed by one or more processors causes the one or more processors to perform a method for image registration utilizing an enhanced phase correlation, the plurality of instructions for the enhanced phase correlation (EPC) comprising:
   instructions for smoothing phase correlation output between the test image and a reference image by multiplying an amplitude shaping function with an absolute amplitude of the test image;
   a phase correlation output representation of Y-Direction shift and X-Direction shift between the test image and the reference image, wherein a correlation surface of the phase correlation output includes a correlation peak, and the Y-Direction shift and the X-Direction shift, relative to a (0,0) coordinate, are the location of the correlation peak coefficient on the correlation surface; and
   instructions for remapping image data to create a hypothesized projection, wherein remapping the image data is accomplished by a coarse sensor model that is not an exact sensor model, wherein the coarse sensor model is a pinhole camera free of any lens; and wherein the reference image is captured from an electro-optical (EO) camera.

2. The image registration system of claim 1, wherein remapping the image data transforms the image data to appear such that the test image was taken from a direct overhead camera.

3. The image registration system of claim 1, wherein the plurality of instructions further comprises instructions for performing one EPC operation and then checking an EPC correlation surface for a valid correlation peak.

4. The image registration system of claim 3, wherein the instructions for performing one EPC operation and then checking the EPC correlation surface for the valid correlation peak, further comprises instructions for determining a correct match between the test image and the reference image with a verification metric (VM), wherein the VM is a peak-to-side lobe ratio defined for the EPC correlation surface.

5. The image registration system of claim 4, wherein the VM measures signal-to-noise ratio of a peak of the EPC correlation surface to area surrounding the peak.

6. The image registration system of claim 5, wherein the VM determines the shape of the peak of the EPC correlation surface is a uni-modal circular peak.

7. The image registration system of claim 6 wherein the plurality of instructions further comprises an instruction for establishing a threshold and making an image registration verity decision, wherein the VM uses a Z-score normalization of a maximum phase correlation value.

8. The image registration system of claim 7 wherein the plurality of instructions further comprises an instruction for establishing a threshold, wherein if the Z-score normalization of a maximum phase correlation is above the threshold then the image registration is verified as correct.

9. The image registration system of claim 3, wherein the plurality of instructions further comprises instructions for looping the one EPC operation over a limited range of scale and rotation.

10. The image registration system of claim 9, wherein the plurality of instructions further comprises instructions for establishing a hierarchical search pattern to increase loop rate.

11. The image registration system of claim 10, wherein the looping is performed on parallel threads.

12. A phase correlation method for image registration including the steps of mapping spatial domain translations to frequency domain linear functions by first obtaining a reference image and a test image which is a translation of the reference image, then, denoting a Fourier transform operator, wherein a complex exponential factor represents a two-dimensional linear phase function corresponding to a spatial domain delta function, and then, obtaining a correlation output between the reference image and the test image in the frequency domain, wherein the improvement comprises the step of:

smoothing the correlation output by multiplying an amplitude shaping function with the test image absolute amplitude;

remapping image data to create a hypothesized projection, wherein remapping the image data is accomplished by a coarse sensor model that is not an exact sensor model, wherein the coarse sensor model is a pinhole camera free of any lens; and wherein the reference image is captured from an electro-optical (EO) camera; and verifying a match between the test image and the reference image.

13. The phase correlation method of claim 12, wherein the improvement further comprises solving translation errors for both frame-to-frame and frame-to-reference video images taken.

14. The phase correlation method of claim 12, wherein the improvement further comprises solving misregistration errors when combined with a sensor parameter search paradigm.

15. The phase correlation method of claim 12, in combination with shape-based object recognition, the combination comprising the step of:

recognizing a target automatically through parametric 3D models using common geometry models for multiple modalities.

16. The phase correlation method of claim 12, in combination with shape-based object recognition, the combination comprising the steps of:

finding a site location in a broad area search of panchromatic satellite imagery; and locating a target within 1 meter satellite imagery using the improvement.

17. A method of enhanced phase correlation image registration comprising the steps of:

capturing a reference image from camera on a vehicle;

capturing a test image from the camera;

overlaying the test image and the reference image in a processor in a computer;

registering the test image and the reference image with phase correlation techniques, wherein the phase correlation techniques includes:

$$I_T(x,y) = I_R(x+\Delta x, y+\Delta y) \quad \text{(Equation 1)}$$

let $I_T(x, y)$, $I_R(x, y)$ represent the test image and reference image, respectively, and the test image ($I_T$) is a translation of the reference image ($I_R$); and denoting a Fourier transform operator by $\mathfrak{F}$, wherein Fourier shift theorem, provides:

$$\mathfrak{F}\{I_T\}(\omega_x,\omega_y) = e^{i(\omega_x \Delta x + \omega_y \Delta y)} \mathfrak{F}\{I_R\}(\omega_x,\omega_y) \quad \text{(Equation 2)}$$

wherein the complex exponential factor in Equation (2) represents a two-dimensional linear phase function, and in a spatial domain, the two-dimensional linear phase function corresponds to a delta function:

$$\mathfrak{F}^{-1}\{e^{i(\omega_x \Delta x + \omega_y \Delta y)}\} = \delta(x+\Delta x, y+\Delta y) \quad \text{(Equation 3)}$$

the phase correlation technique correlates pre-whitened versions of the test image ($I_T$) and reference image ($I_R$) and in a frequency domain, the correlation output (denoted $C_\Phi$) takes the following form:

$$C_\Phi\{I_T, I_R\}(\omega_x, \omega_y) = \frac{\mathfrak{F}\{I_T\}(\omega_x, \omega_y)\mathfrak{F}^*\{I_R\}(\omega_x, \omega_y)}{|\mathfrak{F}\{I_T\}(\omega_x, \omega_y)||\mathfrak{F}^*\{I_R\}(\omega_x, \omega_y)|}; \quad \text{(Equation 4)}$$

continuing to register the test image and the reference image with phase correlation techniques, wherein the phase correlation techniques further includes:

smoothing the correlation output ($C_\Phi$) through multiplication, wherein the amplitude shaping function of Equation (4) is multiplied with the absolute amplitude of the test image, to provide:

$$C_\Phi\{I_T, I_R\}(\omega_x, \omega_y) = \frac{\mathfrak{F}\{I_T\}(\omega_x, \omega_y)\mathfrak{F}^*\{I_R\}(\omega_x, \omega_y)|\mathfrak{F}\{I_T\}(\omega_x, \omega_y)|}{|\mathfrak{F}\{I_T\}(\omega_x, \omega_y)||\mathfrak{F}^*\{I_R\}(\omega_x, \omega_y)|} \quad \text{Equation (7)}$$

simplifying Equation (7) to yield $$C_\Phi\{I_T, I_R\}(\omega_x, \omega_y) = \frac{\mathfrak{F}\{I_T\}(\omega_x, \omega_y)\mathfrak{F}^*\{I_R\}(\omega_x, \omega_y)}{|\mathfrak{F}^*\{I_R\}(\omega_x, \omega_y)|}; \quad \text{Equation (8)}$$

remapping image data to create a hypothesized projection, wherein remapping the image data is accomplished by a coarse sensor model that is not an exact sensor model, wherein the coarse sensor model is a pinhole camera free of any lens; and wherein the reference image is captured from an electro-optical (EO) camera; and developing a correlation output representation of Y-Direction shift and X-Direction shift between the test image and the reference image, wherein a surface of the correlation output surface includes a correlation peak, and the Y-Direction shift and the X-Direction shift, relative to a (0,0) coordinate, are the location of the correlation peak coefficient on the correlation surface.

* * * * *